CHARLES L. SCHULZ.
Improvement in Sawing-Machines.
No. 127,374.　　　　　　　　　Patented May 28, 1872.
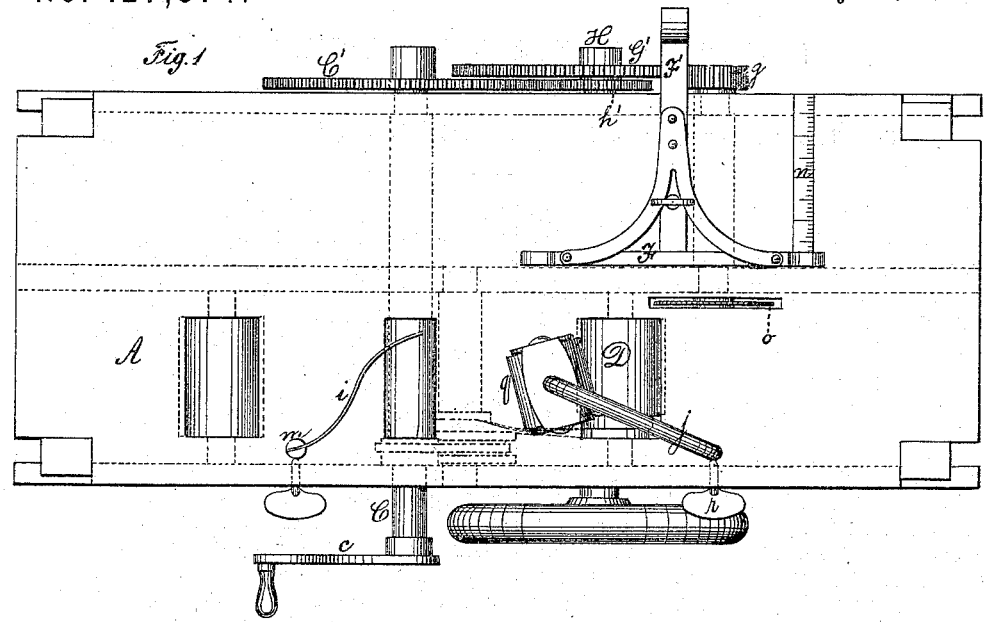
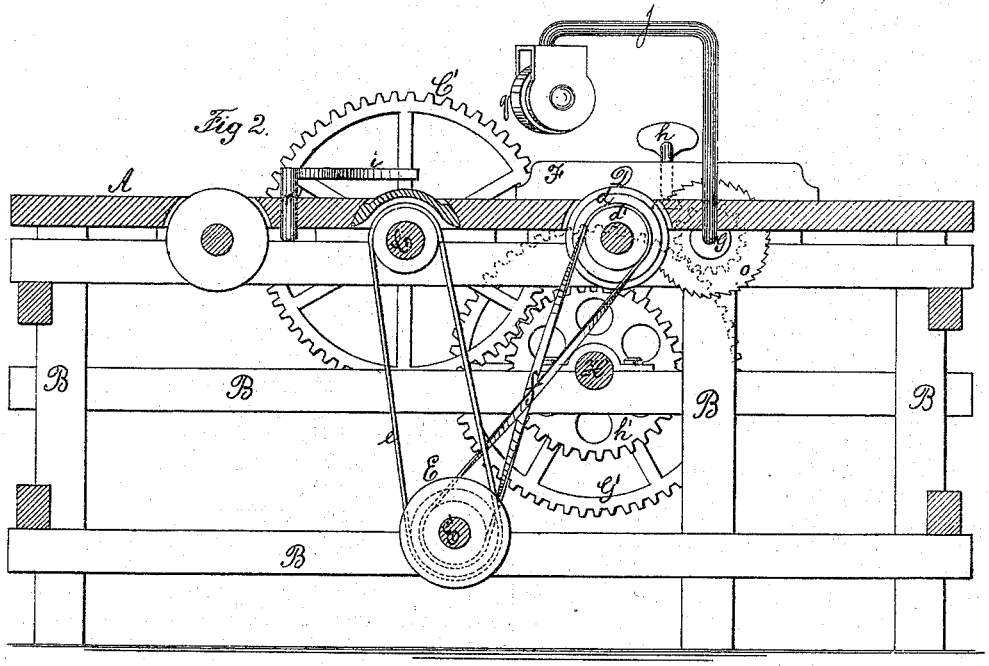
WITNESSES:
Herm. Lauten.
A. Bendz.
INVENTOR:
Charles L. Schulz.
by Geo. E. Brown,
Atty.

UNITED STATES PATENT OFFICE.

CHARLES L. SCHULZ, OF BALTIMORE, MARYLAND.

IMPROVEMENT IN SAWING-MACHINES.

Specification forming part of Letters Patent No. 127,374, dated May 28, 1872.

Specification describing a certain Improvement in Sawing-Machines, invented by CHARLES L. SCHULZ, of Baltimore, in the county of Baltimore and State of Maryland.

This invention relates to a machine for ribbing, plowing, cross-cutting, beading, grooving, and various other kinds of carpenter's work; and consists in an adjustable table that may be raised and lowered on the frame, in combination with a spring-presser on a rotatable stud for pressing the lumber to the guide, a guide to keep the lumber in place, a gauge to regulate the setting of the guide, a feed-roller to feed the lumber, and adjustable presser-roller to hold the lumber on the feed-roller, and certain shafts and spur-gearing, arranged as hereinafter described.

Figure 1 is a top view, and Fig. 2 a longitudinal vertical section.

A is the table on which the stuff is placed, said table being supported upon a frame, B. C is the driving-shaft, worked by hand or other power applied through the crank c. D is the feed-roller, mounted in the frame B, and projecting to a suitable distance above the table A through a slot in the same. E is the counter-pulley aforesaid, the same being placed in a shaft, E', mounted in the frame B below the driving-shaft and feed-roller, and connected with the driving-shaft by means of a belt, e. The counter-pulley E has a step at one side, and the feed-roller D has steps $d$ $d'$ at one end. The shaft E' is connected with the pulley D by means of a belt, $f$, which can be passed around the step of the counter-pulley and the smaller step $d'$, or around the shaft E' and the larger step $d$. In sawing thin or light stuff the speed of the feed-roller can profitably be greater than when sawing thick or heavy stuff, because the operater can handle the former easier than the latter. The speed of the feed-roller can be increased or diminished for this purpose by shifting the belt $f$ from the shaft E' to the step, or vice versa. By connecting the feed-roller with the driving-shaft through the medium of belts and the counter-pulley, not only is this variation of speed made attainable, but the use of ratchets above the table for turning the feed-roller is avoided, and the table is therefore kept clear for the work. F is the guide, the same having a shank, F', placed in a groove cut crosswise of the table A, and having a set-screw, $h$, to fasten it at any point to suit the width of the stuff. The edge of the board rests against the face of the guide being pressed thereunto by a spring, $i$, projecting from a stud, $m$, springing from the table near the edge of the same, and rotatable in order to put the spring $i$ in any desired position. A gauge, $n$, inscribed with a scale denoting inches and feet, is let into the table parallel with the shank F', so as to enable the operator to so set the guide as to cut strips of any width. G is the saw-shaft, mounted crosswise of the frame B beneath the table A, and $o$ is the saw. On the other end of the shaft G is a spur-wheel, $g$, gearing into a larger spur-wheel, G', placed outside the frame B on a shaft, H, mounted crosswise of the same beneath the driving and saw shafts. On the shaft H is a small spur-wheel, $h'$, inside the wheel G', and gearing with another large spur-wheel, C', placed on the driving-shaft C. By this arrangement the speed of the wheel C' is multiplied in proportion as the diameter of G' exceeds that of $h'$, and this accelerated speed is communicated to the saw-shaft. The table A is adjustable on the frame B, and can be raised up therefrom by placing wooden pieces beneath it, so as to vary the depth of grooves, shoulders, &c., cut by the saw. A small pressure-wheel, $q$, is attached to a curved arm, $j$, and capable of being adjusted vertically and laterally, and of being entirely detached from the machine. Said wheel bears upon the upper surface of the lumber and holds it in contact with the feed-roller, so that the feeding of the lumber shall be without intermission.

I claim as my invention—

The combination, with the adjustable table A, of the presser $i$, rotatable stud $m$, guide F, gauge $n$, feed-roller D, pressure-roller $q$, adjustable arm $j$, shafts C H G, saw $o$, and spur-gearing C' G' $g$ $h'$, all arranged as specified.

CHARLES L. SCHULZ.

Witnesses:
GEO. E. BROWN,
A. BENDZ.